Nov. 18, 1930.    O. R. AURAND    1,782,334
COMBINED LIGHT AND SIGNAL
Filed Jan. 28, 1927    3 Sheets-Sheet 1

O. R. Aurand
INVENTOR
BY Victor J. Evans
ATTORNEY

Nov. 18, 1930.   O. R. AURAND   1,782,334
COMBINED LIGHT AND SIGNAL
Filed Jan. 28, 1927   3 Sheets-Sheet 2

O. R. Aurand
INVENTOR

BY Victor J. Evans
ATTORNEY

Nov. 18, 1930.  O. R. AURAND  1,782,334
COMBINED LIGHT AND SIGNAL
Filed Jan. 28, 1927   3 Sheets-Sheet 3

O. R. Aurand
INVENTOR
BY Victor J. Evans
ATTORNEY

Patented Nov. 18, 1930

1,782,334

UNITED STATES PATENT OFFICE

OMER R. AURAND, OF SHAMOKIN DAM, PENNSYLVANIA

COMBINED LIGHT AND SIGNAL

Application filed January 28, 1927. Serial No. 164,279.

This invention relates to a combined signal light system for motor vehicles. The invention is designed to signal by lamps mounted in a casing on the rear of the automobile to indicate to rearward vehicles the operator's intentions in movement of the machine as to turning and stopping.

In carrying out the invention I employ three lamps in a casing, one of which is a combined stop and tail light while the others illuminate indicia to provide directional signals, so as to indicate the intended movements of the operator of a vehicle carrying the system, the circuits to the lamps being controlled by switches manually and automatically operated and serving to put any or all the lamps into operation. One of the switches is arranged on the steering wheel and includes a right and left movable lever which operates a switch arm which closes the circuit to either one of two outside lamps of a group of three mounted on the rear of the vehicle. A second switch is provided in a socket of the steering wheel lever controlled by a push button to actuate a horn. The circuits are so arranged that the horn signal is in potential condition for use irrespective of any switch position. The middle lamp is employed to direct light upon a license plate and to direct a rearward tail light through a lens and is partly illuminated to act as a tail light or fully illuminated to act as a stop light. The middle lamp is fully illuminated when a pedal operated switch which forms a part of the invention, is closed.

My invention, therefore, consists of an automobile signal comprising a group of lamps controllable by the operator at the steering wheel to signal right or left hand turns, a straight away course, and connections controlled by the brake pedal to light all lamps. The invention also comprises structural features of the control switches which will be hereinafter more specifically described and claimed.

Referring now to the drawings.

Figure 1:
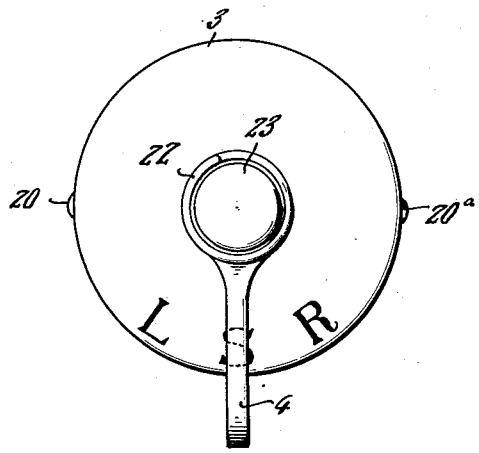
Figure 1 shows a plan of a steering wheel control switch embodying my invention.
Figure 2:
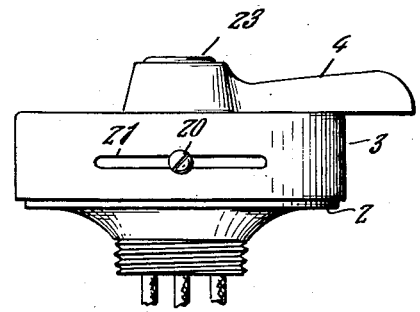
Figure 2 is a side elevation of the switch head.
Figure 5:
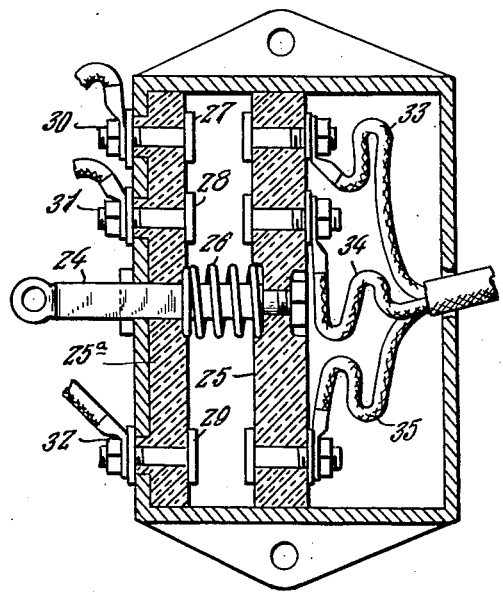
Figure 5 is a sectional view of an auxiliary switch controlled by the power pedal.
Figure 6:
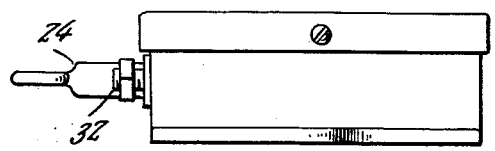
Figure 6 is a side elevation of the same.
Figure 3:
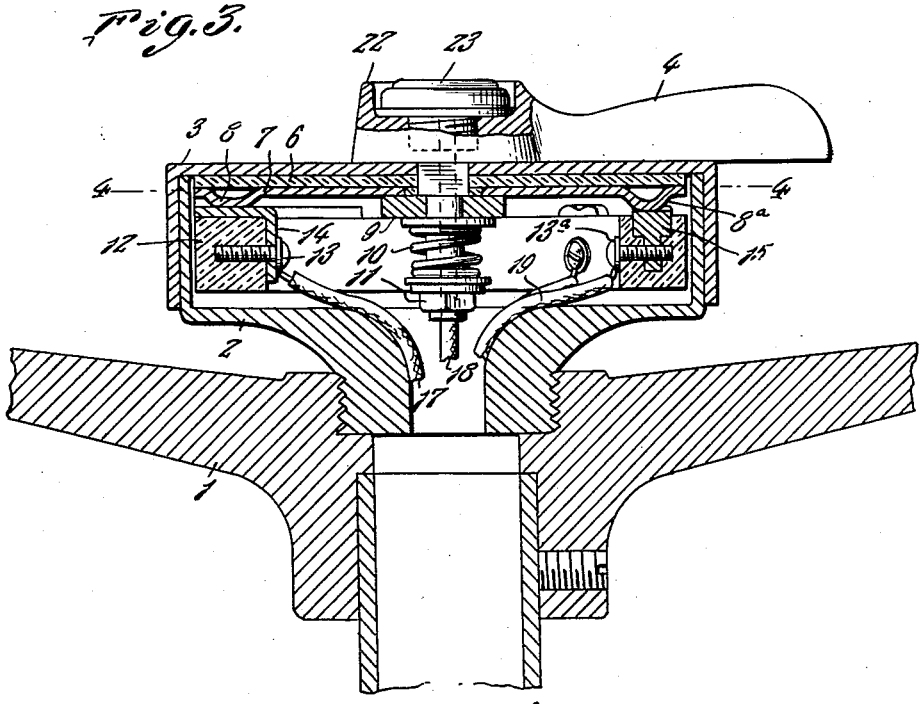
Figure 3 is a sectional view of a steering wheel in part with my control switch applied.
Figure 4:
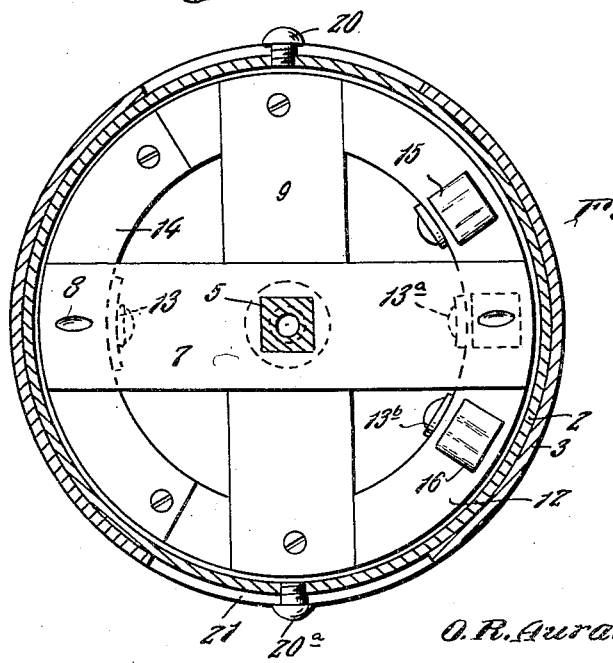
Figure 4 is a sectional view of the control switch on the line 4—4 of Figure 3.
Figure 9:
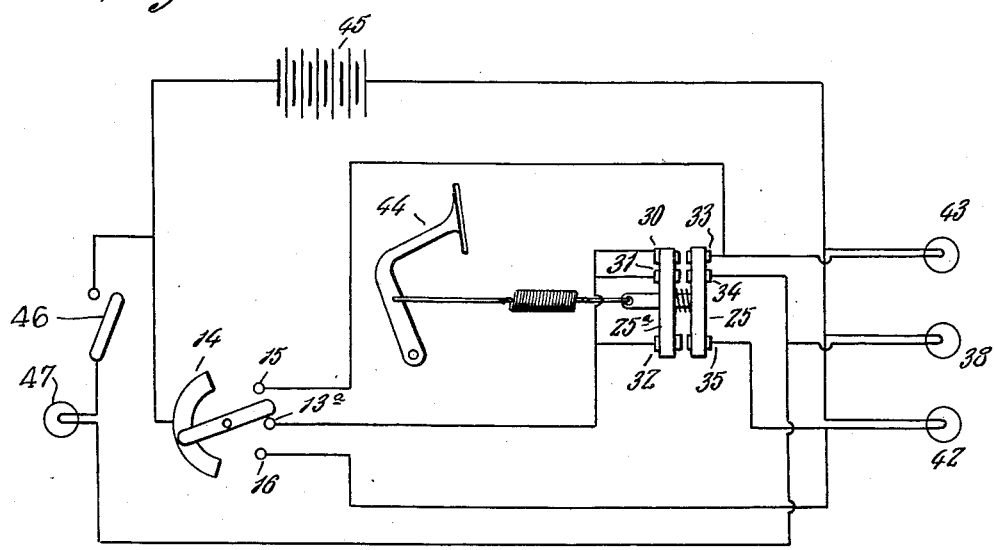
Figure 9 is a diagrammatic representation of my signaling system.
Figure 7:
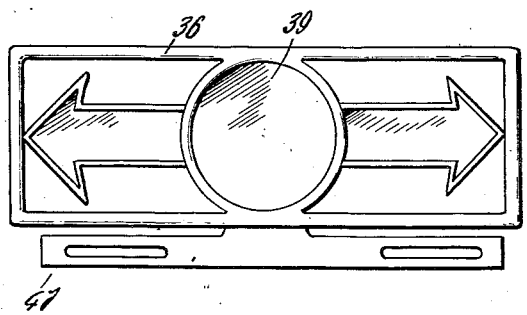
Figure 7 is a detail view of a casing containing a lens and directional signaling indicia.
Figure 8:
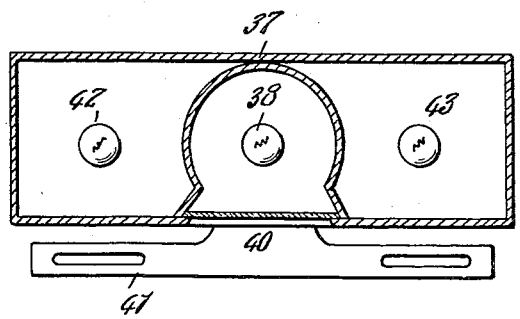
Figure 8 is a cross sectional view showing the construction of the same.

Referring now specifically to the drawings, in Figures 1, 2 and 3, 1 represents a steering wheel in which is mounted a tubular threaded neck of a circular recessed casting 2 forming a receptacle for switch parts of my invention. A cap 3 rests over the recessed inclosure which carries the operative parts of the switch. These comprise a lever 4 cooperating with a square shaft 5 by which the handle may control the movements of the switch. Next to the cap 3 is a fiber plate 6 and a contact plate 7, having depressions 8, 8$^a$ at its ends. A transverse brass plate 9 clamps the plate 7 to the cover, a compression-spring 10 with a washer above and below being put under compression by a nut 11. Mounted in the recess of the casting 2 is an annular fiber ring 12 to which is fastened by set screws 13, 13$^a$, 13$^b$ contacts 14, 15, 16 to which are secured insulated leads leading through the steering wheel to three lamps and a lead 17 from the arc-shaped contact 14. The handle 4 has only a limited motion to control its adjustment over a limited angle and this is effected by two set screws 20, 20$^a$ cooperating with slots 21 (Fig. 2) in the cap 3. The contact 14 is of an arc shape to permit movement of the lever 4 to engage any contact 14, 15 or 16 and effect the circuit conditions. Within a recess 22 in the handle hub is mounted a standard type of push button 23, the lower contact of which engages an insulated wire 18 controlling the horn. In Figure 5 I have shown the operative parts of my switch which is controlled by the application of the brake or clutch pedal. This comprises a movable bar 24 connected to a movable fiber disk 25 and when drawn forward by movement of the foot pedal (Fig. 9) puts the spring 26 under compression and permits a plurality of contacts 27, 28, 29 to be engaged by cooperating contacts on the fiber disk 25. Circuit terminals 30, 31, 32 are mounted by nuts on the contacts carried by the fixed fiber disk 25ª. The disk or plunger 25 carries terminals connected with the contacts thereof and secured to these terminals are leads or conductors 33, 34, 35. The signal lamps are mounted in a metallic casing 36 rectangular in form (Figs. 7 and 8) and provided with a central compartment 37 to confine the rays of the tail light 38 and shed them forward through a lens 39 and downwardly through a glass pane 40 to illuminate a license plate supported on a bar 41. The outside lamps 42, 43 transmit their rays rearward through directional indicia which as shown are in the form of arrows.

It will be apparent from what has been hereinbefore said that operating the lever 4 to the left or the right will shift the contact plate 7 into engagement with contact 15 or 16 and simultaneously glide over the cooperating contact 14, thereby actuating the left hand lamp 42 or the right hand lamp 43. I have represented in Figure 1 the right or left turns with the letters L and R, the stop or slow signal by the letter S, and these are placed in such position on the steering wheel switch as to correspond with the angular movements of the switch arm. The driver when operating under normal conditions keeps the switch lever in alignment with the letter S. When the driver applies the pedal 44 the contacts on the pedal switch are brought together and all lamps are lighted signaling a stop, the lead from the contact 13ª is connected in parallel with contacts 30, 31, 32, and the circuit is completed from the storage battery 45 (Fig. 9) through all lamps, thus indicating a stop or slow down. A dash or pilot lamp is controlled by a switch 46 in the circuit which includes the center lamp 38, the latter being in series with the dash or pilot lamp 47, whereby when the switch 46 is closed, the lamp 38 is partly illuminated so as to act as a tail light, but when the pedal switch is closed, the lamp 38 is fully illuminated and simultaneously with the directional signal lamps 42 and 43 to indicate a stop as above set forth. The steering wheel carried switch must be arranged, whereby the plate 7 is bridging the contacts 13ª and 14, when the pedal switch is applied so as to complete the direct circuit to the lamp 38 through the battery, whereby the latter will be fully illuminated. However, the steering wheel switch selectively illuminates the lamps 42 and 43 when the pedal switch is open.

Having thus described my invention, what I claim as new and desire to secure by Letters Patent is:

In a vehicle signaling device, directional signal lamps, a stop lamp, a pilot lamp, a source of electrical energy in a circuit with the lamps, said pilot lamp being in a series circuit with the stop lamp to normally retain the latter partly illuminated, a switch for controlling the said series circuit to act as a tail lamp, a switch in the first mentioned circuit and carried by the steering wheel of a vehicle to selectively illuminate the directional signal lamps, and a vehicle controlling pedal operated switch in the first mentioned circuit to illuminate the stop lamp to full brilliancy and the directional signal lamps simultaneously therewith to indicate a stop.

In testimony whereof I affix my signature.

OMER R. AURAND.